US009679120B2

(12) United States Patent
Koerkel et al.

(10) Patent No.: US 9,679,120 B2
(45) Date of Patent: Jun. 13, 2017

(54) ENCRYPTING MULTICAST DATA IN A WAGERING GAME NETWORK

(75) Inventors: Donald E. Koerkel, Hanover Park, IL (US); Jason A. Smith, Vernon Hills, IL (US); Craig J. Sylla, Round Lake, IL (US)

(73) Assignee: Bally Gaming Inc., Las Vegas, NV (US)

( * ) Notice: Subject to any disclaimer, the term of this patent is extended or adjusted under 35 U.S.C. 154(b) by 697 days.

(21) Appl. No.: 13/464,178

(22) Filed: May 4, 2012

(65) Prior Publication Data

US 2012/0283010 A1   Nov. 8, 2012

Related U.S. Application Data

(60) Provisional application No. 61/482,695, filed on May 5, 2011.

(51) Int. Cl.
| | |
|---|---|
| *G06F 21/30* | (2013.01) |
| *G06F 21/31* | (2013.01) |
| *G06Q 50/34* | (2012.01) |
| *G06Q 30/00* | (2012.01) |
| *G07F 17/32* | (2006.01) |
| *H04L 29/06* | (2006.01) |
| *H04L 9/08* | (2006.01) |

(52) U.S. Cl.
CPC ............ *G06F 21/31* (2013.01); *G06Q 30/00* (2013.01); *G06Q 50/34* (2013.01); *G07F 17/3225* (2013.01); *G07F 17/3241* (2013.01); *H04L 9/0833* (2013.01); *H04L 9/0863* (2013.01); *H04L 9/0869* (2013.01); *H04L 63/0428* (2013.01); *H04L 63/065* (2013.01); *G06F 2221/2107* (2013.01); *G06F 2221/2109* (2013.01)

(58) Field of Classification Search
None
See application file for complete search history.

(56) References Cited

U.S. PATENT DOCUMENTS

| 6,041,123 | A   * | 3/2000 | Colvin, Sr. ................... 713/153 |
|---|---|---|---|
| 7,549,058 | B1 * | 6/2009 | Wang et al. .................. 713/189 |
| 2009/0240943 | A1 * | 9/2009 | Brown et al. ................. 713/171 |
| 2011/0212770 | A1 * | 9/2011 | Ocko et al. ..................... 463/29 |
| 2013/0016838 | A1 * | 1/2013 | Hu et al. ........................ 380/255 |

* cited by examiner

*Primary Examiner* — John Hayes
*Assistant Examiner* — Tim Hale
(74) *Attorney, Agent, or Firm* — Nixon Peabody LLP

(57) ABSTRACT

Systems and methods described herein include wagering game systems that communicate with servers or other entities in a wagering game network using multicast groups. Data transmitted over the network for the multicast group is encrypted. Keys for the encryption and decryption of the data are generated based on a current key index for the multicast group, and a global passphrase. The global passphrase is not transmitted over the network.

18 Claims, 9 Drawing Sheets

ENCRYPTING MULTICAST DATA IN A WAGERING GAME NETWORK

CROSS-REFERENCE TO RELATED PATENT DOCUMENTS

This application claims the benefit of priority under 35 U.S.C. 119(e) to U.S. Provisional Patent Application Ser. No. 61/482,695, filed on May 5, 2011, which is incorporated herein by reference in its entirety.

LIMITED COPYRIGHT WAIVER

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2011, WMS Gaming, Inc.

FIELD

Embodiments of the inventive subject matter relate generally to wagering game network systems, and more particularly to encrypting multicast data transmitted or received in wagering game network systems.

BACKGROUND

Wagering game machines, such as slot machines, video poker machines and the like, have been a cornerstone of the gaming industry for years. Generally, the popularity of such machines with players is dependent on the likelihood (or perceived likelihood) of winning money at the machine and the intrinsic entertainment value of the machine relative to other available gaming options. Players also appreciate the reliability of a gaming machine, as do the casino operators. Shrewd operators consequently strive to employ the most entertaining, exciting, and reliable machines available because such machines attract frequent play and hence increase profitability to the operator.

It is common to have networks of wagering game machines to facilitate activities related to wagering such as providing progressive wagering games, community based wagering games, downloadable games or serving ads to wagering game machines. It is often a requirement that such networks encrypt data between participating entities in the network. It is typically the case that wagering game network providers use point to point encryption techniques between participating entities in the network.

BRIEF DESCRIPTION OF THE FIGURES

Embodiments of the invention are illustrated by way of example and not limitation in the Figures of the accompanying drawings in which.

DESCRIPTION OF THE EMBODIMENTS

The following detailed description refers to the accompanying drawings that depict various details of examples selected to show how the present invention may be practiced. The discussion addresses various examples of the inventive subject matter at least partially in reference to these drawings, and describes the depicted embodiments in sufficient detail to enable those skilled in the art to practice the invention. Many other embodiments may be utilized for practicing the inventive subject matter other than the illustrative examples discussed herein, and many structural and operational changes in addition to the alternatives specifically discussed herein may be made without departing from the scope of the inventive subject matter.

In this description, references to "one embodiment" or "an embodiment," or to "one example" or "an example" are not intended necessarily to refer to the same embodiment or example; however, neither are such embodiments mutually exclusive, unless so stated or as will be readily apparent to those of ordinary skill in the art having the benefit of this disclosure. Thus, the present invention can include a variety of combinations and/or integrations of the embodiments and examples described herein, as well as further embodiments and examples as defined within the scope of all claims based on this disclosure, as well as all legal equivalents of such claims.

In general, the systems and methods described herein include wagering game systems that communicate with servers or other entities in a wagering game network using multicast groups. Data transmitted over the network for a multicast group is encrypted using keys that are not provided over the network. In order to provide a more secure environment for transmitting multicast data, the keys are at times rotated (i.e., changed). Keys for the encryption and decryption of the data are generated based on a current key index for the multicast group, and a global passphrase. The global passphrase is not transmitted over the network. Thus multiple systems may participate in the multicast group, and the global passphrase need not be transmitted to any of the systems over the network. The machines participating in the multicast group use the same random generator, and, when provided the current key index, can generate the appropriate key for use in encrypting or decrypting messages.

Figure 1:
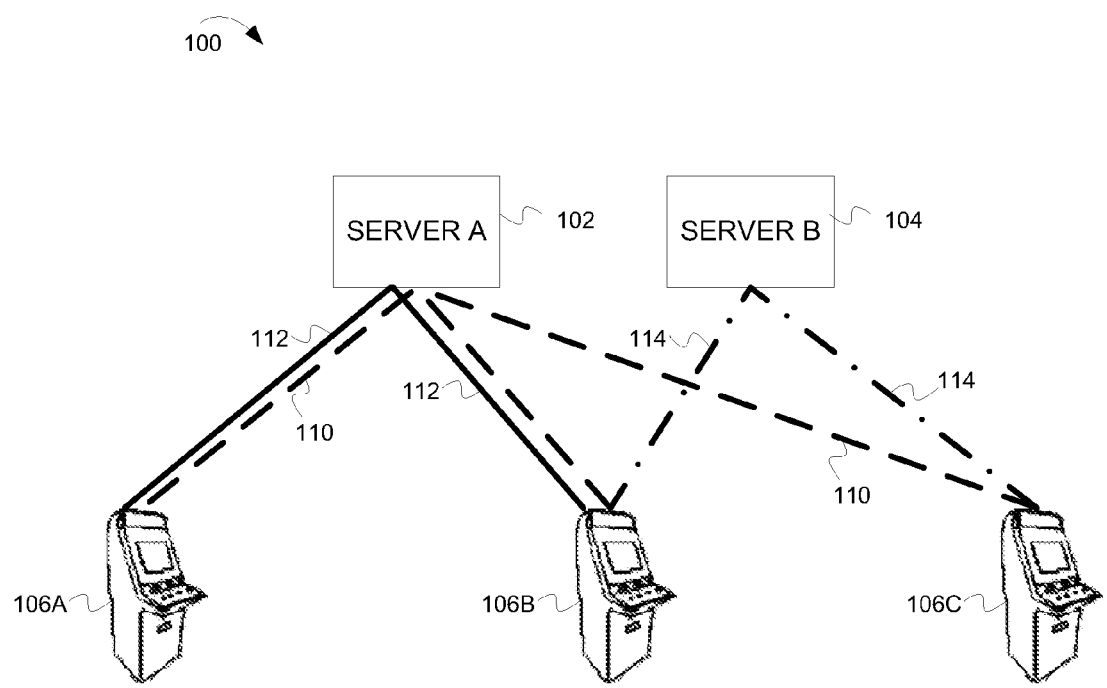
FIG. 1 depicts a logical view of an example wagering game network using multicast data transmission according to embodiments of the invention.

FIG. 1 depicts a logical view of an example wagering game network system 100 using multicast data transmission according to embodiments of the invention. In some embodiments, system 100 includes two servers 102 and 104, and wagering game machines 106A-C coupled via a network to multicast groups 110, 112 and 114. Servers 102 and 104 may be any type of server in a wagering game network. Such servers may provide various types of services, including progressive services, advertising services, game download services, or centralized game control services. A single server may provide more than one type of service. Although two servers 102 and 104 are illustrated in FIG. 1, it should be noted that the embodiments of the invention may operate in systems having more or fewer servers.

Wagering game machines 106A-C present wagering games. Wagering game machines 106A-C can be any type of wagering game machine and can have varying structures and methods of operation. For example, the wagering game assembly 100 can be an electromechanical wagering game machine configured to play mechanical slots, or it can be an electronic wagering game machine configured to present video casino games, such as blackjack, slots, keno, poker, blackjack, roulette, etc. Further details on wagering game machines 106 are provided below with respect to FIG. 8.

Wagering game machines 106A-C may be coupled to various multicast groups that exist on a network. A multicast group defines a group of network connected nodes in which a message transmitted on a network address associated with the group is sent (i.e., broadcast) to each node participating in the multicast group. A multicast group may also be referred to as a "channel." In the example illustrated in FIG. 1, three multicast groups 110, 112 and 114 are present. Server 102 and wagering game machines 106A, 106B and 106C participate in multicast group 110. Server 102 and wagering game machines 106A and 106B participate in multicast group 112. Server 104 and wagering game machines 106B and 106C participated in multicast group 114. Each multicast group may exist for different purposes. For example, a multicast group may be used to send progressive jackpot updates to all wagering game machines participating in a particular progressive game. A multicast group may be used to provide centralized control of a wagering game. A multicast group may be used to download a game to multiple wagering game machines that are configured to play the game. A multicast group may be used to send advertising to machines. Such uses for multicast groups are provided as an example; the inventive subject matter is not limited to any particular use for a multicast group.

In some embodiments, one multicast group is used to provide a guide (i.e., a channel guide) to uses or services provided through other multicast groups. As an example, if a particular wagering game machine 106 desires to know which multicast group is used to providing a particular progressive service, the wagering game service can join the guide multicast group in order to receive messages on the guide multicast group that periodically broadcasts data that identifies other multicast groups. This data includes data that allows the wagering game machine to join the desired multicast group providing the desired progressive service.

To illustrate the above, assume that server 102 maintains a channel or multicast group guide and uses multicast group 110 to send details about available channels to interested nodes. Further assume that server 102 provides a first progressive game. Additionally, server 104 provides a game update service. In this example, wagering game machines 106A, 106B and 106C joined the channel guide multicast group 110. Using information provided by the channel guide, wagering game machines 106A and 106B joined the multicast group 112 (i.e., channel) for the progressive game provided by server 102. Additionally, wagering game machines 106B and 106C joined the multicast group 114 to receive game updates from server 104. As is illustrated in FIG. 1, wagering game machines can join multiple multicast groups, and servers may also provide multiple multicast groups.

Figure 2:
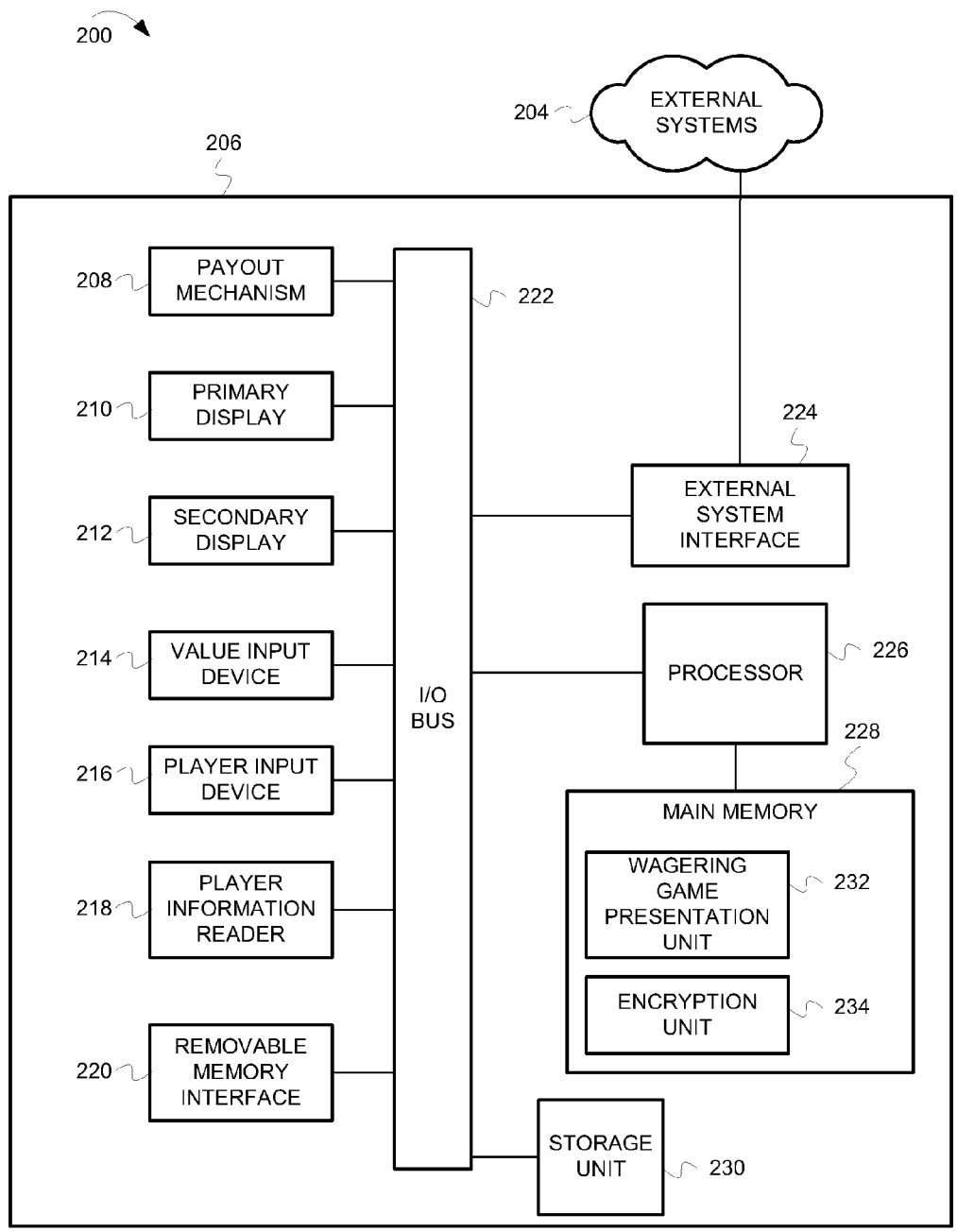
FIG. 2 schematically depicts a representation of one example of a wagering game assembly according to embodiments of the invention.

FIG. 2 is a block diagram representation of an architecture of an example wagering game machine 206, including a control system, according to example embodiments of the invention. As shown in FIG. 2, the example wagering game machine 206 includes a processor 226 connected to system main memory 228, and a wagering game presentation unit 232. Wagering game presentation unit 232 can present wagering games at least in part through display functionality associated with the system, such as, for example, the previously described roulette and "virtual" or video poker, blackjack, keno, etc. In this example configuration, the processor 226 is also connected to an input/output (I/O) bus 222, which facilitates communication with and between the wagering game machine's additional components. It should be clearly understood that many wagering game machines will not include all of the described components; and that components need not be connected through a single bus, or through a bus at all. In this illustrative example, the I/O bus 222 is connected to a payout mechanism 208, primary display 210 (which may be either a touch screen display or a conventional display), secondary display 212, a value input device 214, a player input device 216, and a player information reader 218 and other output devices. The I/O bus 222 may also be connected to an external system interface 224, which is connected to external systems 204 (e.g., wagering game networks). The external system interface may be used to join and participate in multicast groups.

When present, the value input device 214 can include, for example, a reader configured to receive credit from a stored-value card (e.g., casino card, smart card, debit card, credit card, etc.) inserted by a player. The value input device 214 can also comprise a sensor (e.g., an RF sensor) configured to sense a signal (e.g., an RF signal) output by a transmitter (e.g., an RF transmitter) carried by a player. The value input device 214 can also or alternatively include a ticket reader, or barcode scanner, for reading information stored on a credit ticket, a card, or other tangible portable credit or funds storage device. The credit ticket or card can also authorize access to a central account, which can transfer money to the wagering game machine 206. Still other value input devices 214 can make use of touch keys on the touch screen. Upon entry of player identification information and, preferably, secondary authorization information (e.g., a password, PIN number, stored value card number, predefined key sequences, etc.), the player can be permitted to access a player's account. As one potential optional security feature, the wagering game machine 206 can be configured to permit a player to only access an account the player has specifically set up for the wagering game machine 206. Other conventional security features can also be utilized to, for example, prevent unauthorized access to a player's account, to minimize an impact of any unauthorized access to a player's account, or to prevent unauthorized access to any personal information or funds temporarily stored on the wagering game machine 206.

The player input device 216 can include the value input device 214 to the extent the player input device 216 is used to place wagers. Where inputs and/or wagers are received through the touch screen, as described herein, in many example systems, there may be no need for a separate player input device. In some examples, the wagering game machine 206 will include a player information reader 218 that facilitates identification of a player by reading a card with information indicating the player's identity (e.g., reading a player's credit card, player ID card, smart card, etc.). Such player information reader 218 can alternatively, or also, include a bar code scanner, RFID transceiver or computer readable storage medium interface. In one embodiment, the player information reader 218 comprises a biometric sensing device. Another application of the player information reader 218 may include a reader, such as an RFID interrogator, to read an RFID tag or other RFID device.

In some embodiments, wagering game assembly 200 includes a removable memory interface 220. In some embodiments, the removable memory interface provides an interface between a portable memory device and the wagering game assembly. The portable memory device may be a memory card or a dongle. In some embodiments, the removable memory interface may be a USB interface.

In some embodiments, an encryption unit 234 encrypts and decrypts data received via external system interface 224. Although illustrated as resident in main memory 228, encryption unit 234 may be software, hardware, firmware or any combination of the above. Further details on the configuration and operation of encryption unit 234 are provided below.

In one embodiment, the wagering game machine 206 can include additional peripheral devices and/or more than one of each component shown in FIG. 2. For example, in some cases, the wagering game machine 206 can include multiple external system interfaces 224 and multiple processors 226. In one embodiment, any of the components can be integrated or subdivided. Additionally, in one embodiment, the components of the wagering game machine 206 can be interconnected according to any suitable interconnection architecture (e.g., directly connected, hypercube, etc.).

In one embodiment, any of the components of the wagering game machine 206 can include hardware, firmware, and/or software for performing the operations described herein. Where functionality is performed at least in part through execution of instructions retained in software and/or firmware, those instructions will be stored (in the machine or in another component) in one or more instances of machine-readable storage media. Machine-readable media includes any mechanism that provides (e.g., stores and/or transmits) information in a form readable by a machine (e.g., a wagering game machine, computer, etc.). Machine-readable media thus includes any media suitable for transmitting software over a network. The above-mentioned "machine readable storage media" is a subset of such machine-readable media, and includes any form of tangible storage media capable of storing data and/or instructions, including, for example, read only memory (ROM), random access memory (RAM), magnetic disk storage media, optical storage media, flash memory devices, etc.

Figure 3A:
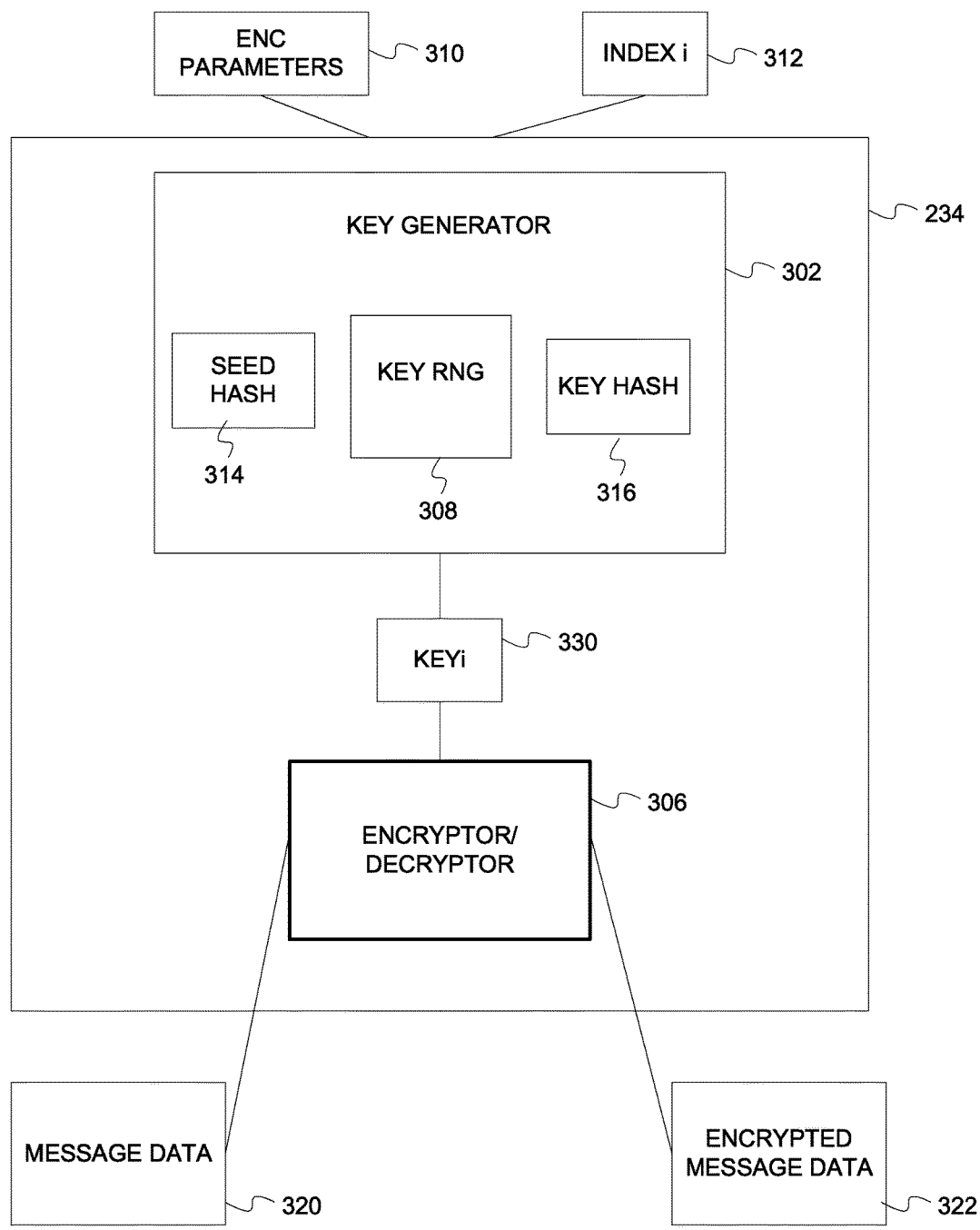
FIGS. 3A and 3B depict block diagrams of logical components of example key generators for a wagering game system as described herein.

FIG. 3A is a block diagram providing further details of an encryption unit 234. In some embodiments, encryption unit 234 includes a key generator 302 and an encryptor/decryptor 306. In some embodiments, encryptor/decryptor 306 implements an AES encryption function. In general, key generator 302 receives input parameters such as encryption parameters 310 and key index 312 and uses either or both of the encryption parameters 310 and key index 312 to generate keys 330.

Key generator 302 includes a key random number generator (RNG) 308. An RNG may also be referred to as a pseudo-random number generator. Key RNG 308 may be any type of RNG now known in the art or developed in the future. In some embodiments, key RNG 308 is used solely in the generation of encryption keys and is thus separate from other RNGs that may be present on a wagering game machine, such as an RNG that is used to determine outcomes of a wagering game. Key RNG 308 takes a seed value which is used to produce a series of values, where the series of values varies depending on the seed that is supplied. After a seed value is supplied, each invocation of the RNG produces a new value in the series. Key RNG 308 may be any type of generator that, for a given initial state, generates the same output upon an invocation of the generator. For example, a pseudo-random number generator generates the same sequence of values for a given seed value. Similarly, an RNG may comprise a generator that uses a file or memory block that has data that does not change from invocation to invocation of the RNG, and where a starting offset in the file or block is randomly selected and used to provide values. Any RNG that uses the same starting offset and same file or memory block will produce the same sequence of values. In general, key RNG 308 may include any deterministic algorithm that provides a consistent sequence of values based on a known state, where it is computationally inconvenient to determine the sequence of values that will be produced if the starting point is not known.

In some embodiments, key generator 302 includes a seed hash 314. Seed hash 314 takes an input value, applies a hashing function to the input value, and produces an output value that is used as a seed to key RNG 308. Any type of hashing function now known or developed in the future may be used to implement seed hash 314. Examples of such hash functions include MD5, SHA1, SHA256, and SHA512.

In some embodiments, key generator 302 includes a key hash 316. Key hash 316 takes as input the output of key RNG 308, applies a hashing function to the input value, and produces an output value that is key$_i$ 330. Key$_i$ 330 is then used as a key by encryptor/decryptor 306 to encrypt message data 320 into encrypted message data 322 or to decrypt encrypted message data 322 to message data 320. As with seed hash 314, key hash 314 may utilize any type of hashing function now known or developed in the future. Examples of such hash functions include MD5, SHA1, SHA256, and SHA512.

Key index 312 is used to determine the number of times to invoke key RNG 308 to produce a desired key$_i$ 330, where i corresponds with a key index 312. As used herein, key$_0$ represents the first key generated, and key$_i$ will represent the i+1 key generated using key RNG 308. As noted above, a key used to encrypt or decrypt multicast data transmitted or received over a network may be periodically rotated. The key index may be used to determine the current key in use for the multicast group. For example, a wagering game machine desiring to join a multicast group that has been in operation for some time and may have undergone numerous key rotations will need to know the current key index in order to determine the correct key.

Encryption parameters 310 may also be used along with key indexes to generate keys or encrypt data. Encryption parameters 310 may include one or more of passphrases or initialization vectors. Additionally, encryption parameters 310 may include data specifying hash functions to be used by key generator 302. Various passphrases may be used. In some embodiments, a global passphrase is used as input to seed hash 314. The global passphrase may be any arbitrary sequence of bytes. In some embodiments, the global passphrase is configured as part of a server (e.g., a central gaming server) and is then supplied to wagering game machines outside of any network coupling the wagering game machine to the server. For example, the global passphrase may be supplied to a wagering game machine by a technician entering the global passphrase through a user interface on the wagering game machine. Alternatively, the global passphrase may be stored on a removable memory device such as a dongle that is temporarily coupled to the wagering game machine to allow the transfer of the global passphrase to the wagering game machine. In either case, the global passphrase comprises a shared secret that is not transmitted over a network and thus not susceptible to any network snooping techniques that a malicious user may attempt to use to defeat security for a multicast group.

Encryption parameters 310 may include a private passphrase. A private passphrase is a sequence of arbitrary bytes that may be generated by a server such as a central game controller. In some embodiments, the private passphrase is combined with the output of key RNG 308 to supply as input to key hash 316. Although the private passphrase will typically be different from the global passphrase, in some embodiments, the private passphrase is the same as the global passphrase.

Encryption parameters 310 may include an initialization vector. An initialization vector is a set of random values that may be used by the encryption/decryption algorithms employed by encryptor/decryptor 306 to produce stronger encryption of data. In some embodiments, a new initialization vector is generated by a server such as a centralized game controller when the server is power cycled or otherwise rebooted. Further, the initialization vector may be periodically rotated.

As illustrated in FIG. 1, a single wagering game machine or server may participate in multiple multicast groups. In embodiments having one key RNG 308 as illustrated in FIG. 3, multiple channels or multicast groups may be handled in various ways. For example, upon receiving a key index for a different channel, the key RNG 308 may be reinitialized using the same seed value as was originally provided. The key RNG 308 is then invoked the number of times indicated by the index value for the multicast group. In some embodiments, each multicast group is assigned an offset or delta that is added to the group's key index value in order to determine the number of times to invoke key RNG 308 to provide a key. The use of such an offset or delta insures that two multicast groups do not share key values.

In alternative embodiments, the output of a series of invocations of key generator 302 may be saved in memory, for example as an array of keys. The key index is then used as an index into the array of stored keys. As described above, each multicast group may be assigned a unique offset that is added to the multicast group's key index to determine a final index into the array of stored key values.

Figure 3B:
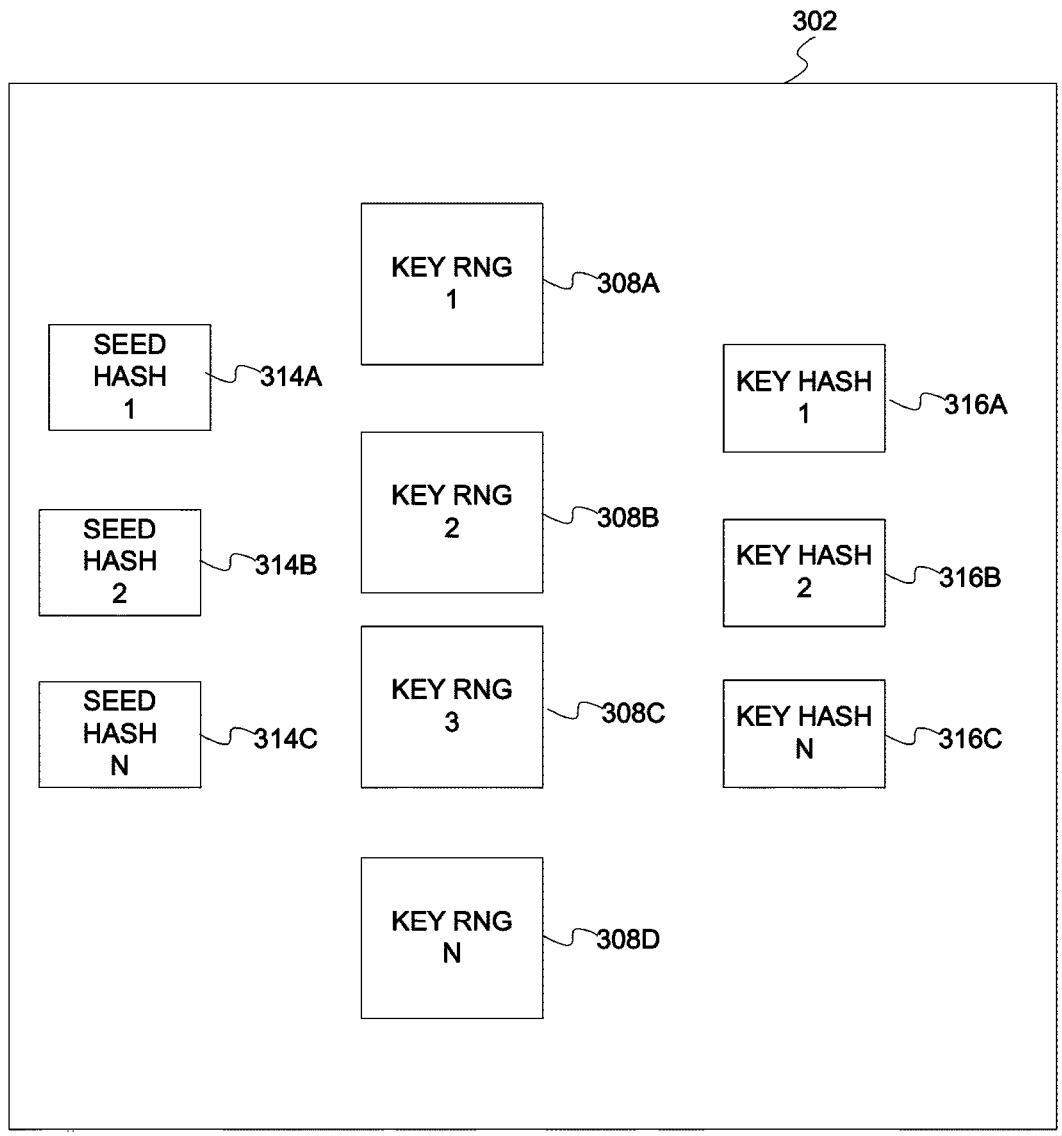

FIG. 3B is a block diagram providing further details of key generator 302 according to alternative embodiments of the invention. In some embodiments, key generator 302 maintains multiple key RNGs 308, one key RNG for each multicast group (i.e., channel) that is encrypted. Because each multicast group is assigned a different key RNG, and may have a different key index, a $key_i$ 330 may be efficiently generated without having to reseed a single key RNG and iteratively invoke the key RNG to obtain values used to generate a desired key or store numerous results of the key RNG.

FIG. 3B also illustrates that various embodiments may include multiple seed hashes 314 or key hashes 316. For example, in some embodiments, a server may dynamically (i.e., at runtime) or statically (i.e. at compile time) determine which of a plurality of seed hashes 314 or key hashes 316 are to be used by the multicast group. The server may communicate which seed hash or key hash to use to an entity joining the multicast group. An index, name, or other identifier may be used to identify the seed hash or key hash that is to be used.

FIGS. 1-3B have provided details on various hardware and software architectures and features of wagering game machine configurations that encrypt and decrypt messages in a multicast group.

Example Operations for Generating an Encryption Key

Figure 4:
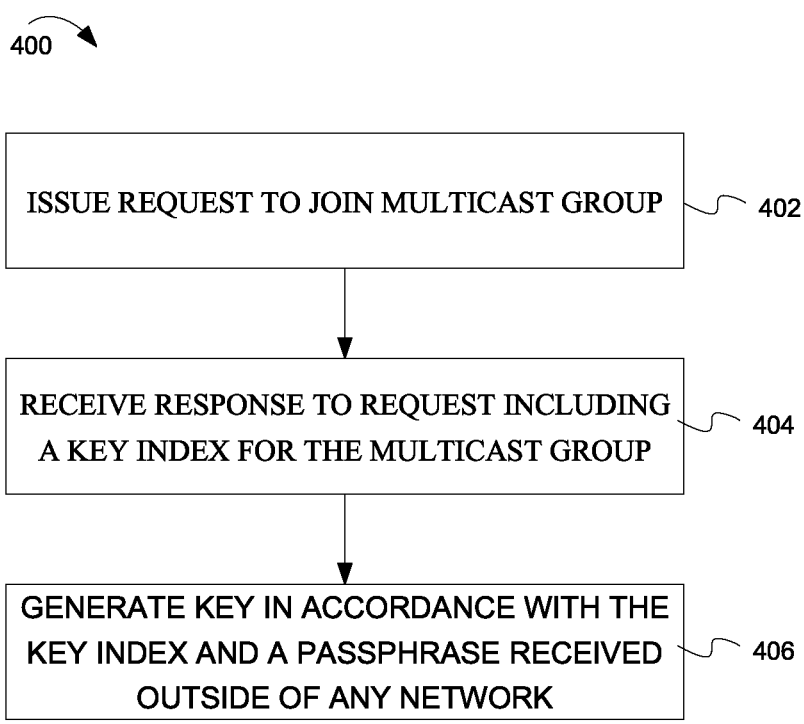
FIG. 4 depicts a flow chart of an example method for generating a key for use in a multicast group.

FIG. 4 depicts a flowchart 400 of an example method for generating an encryption key for encrypting multicast data. The method may be performed at various points in time during the operation of a wagering game machine, for example during wagering game machine initialization, during an attract mode, during a game select mode or during the presentation of a base wagering game or bonus wagering game. The method begins at block 402 when an entity on the network, such as a wagering game machine, issues a request to join a multicast group. In some embodiments, the requesting entity may obtain an identification of the desired multicast group through a channel guide, which itself may be provided through periodic data transmissions on a multicast group.

A server receiving the request issues a response, which is received at block 404 by the requesting entity. The response includes a network address and port assigned to the multicast group along with a key index for the requested multicast group. In some embodiments, the response may include a private passphrase generated by the server and an initialization vector (also generated by the server) for an encryptor/decryptor module used to encrypt and decrypt messages transmitted in the multicast group.

At block 406, a key is generated, using the key index and a global passphrase that was previously provided to the requesting client. Unlike the private passphrase, the global passphrase is not provided over a network connection. Instead, the global passphrase is supplied outside of any network. In some embodiments, the global passphrase may be provided through a user interface, where a technician may provide the global passphrase as part of a configuration for a gaming machine. In alternative embodiments, the global passphrase may be supplied to a client node using a removable memory device that is temporarily coupled to the client. The global passphrase may be copied from the removable memory device and stored in the memory of a client (e.g., a wagering game machine). As an example, the global passphrase may be stored on a dongle. The global passphrase will match a global passphrase that is used by the server responsible for the multicast group.

Figure 5:
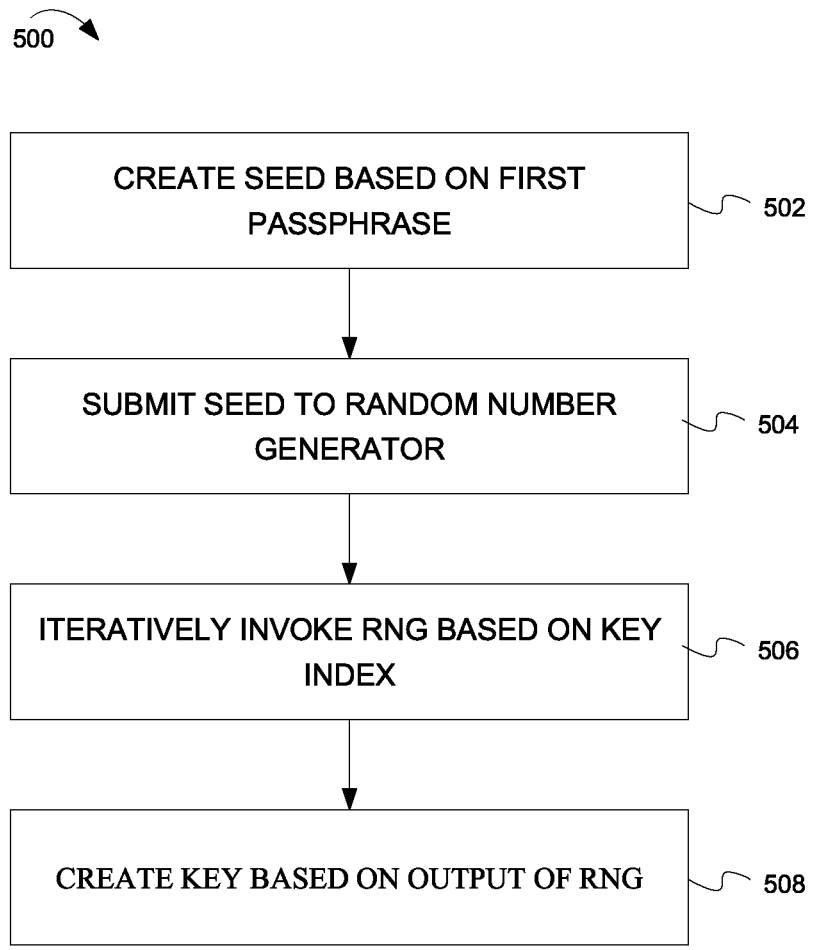
FIG. 5 depicts a flow chart providing further details of the method for generating a key for use in a multicast group.

FIG. 5 is a flowchart 500 providing further details on how the global passphrase and key index are used in block 406 to generate a key. At block 502, a seed is created using the global passphrase. In some embodiments, the seed is created by applying a seed hashing function (element 314, FIG. 3A) to the global passphrase. In particular embodiments, this generates 96 bits of seed data.

At block 504, the generated seed data is submitted to the key RNG, which outputs random data in response. In some embodiments, the key RNG provides 16 bytes of random data. The random data produced in this first invocation of the RNG may be used to generate the first key for the multicast group, $key_0$. In some embodiments, $key_0$ is generated by forming a bitwise concatenation of the private passphrase, the random data and the private passphrase a second time. The bitwise concatenation is then submitted to a key hashing function (e.g., key hash 316, FIG. 3A). This output is then used as $key_0$ in some embodiments.

At block 506, a key is selected according to the key index provided in the response to join the multicast group. In some embodiments, a key is selected by invoking the key RNG the number of times indicated by the index plus one. For example, to obtain $key_n$, the key RNG is seeded as described in block 504 and then iteratively invoked n+1 times.

At block 508, the final output of the key RNG is used to determine $key_n$. In some embodiments, the final output of the key RNG from block 506 is used in a bitwise concatenation of the private passphrase with the key RNG output and again the private passphrase. The results of the concatenation are provided to the key hashing function to generate $key_n$.

Figure 6:
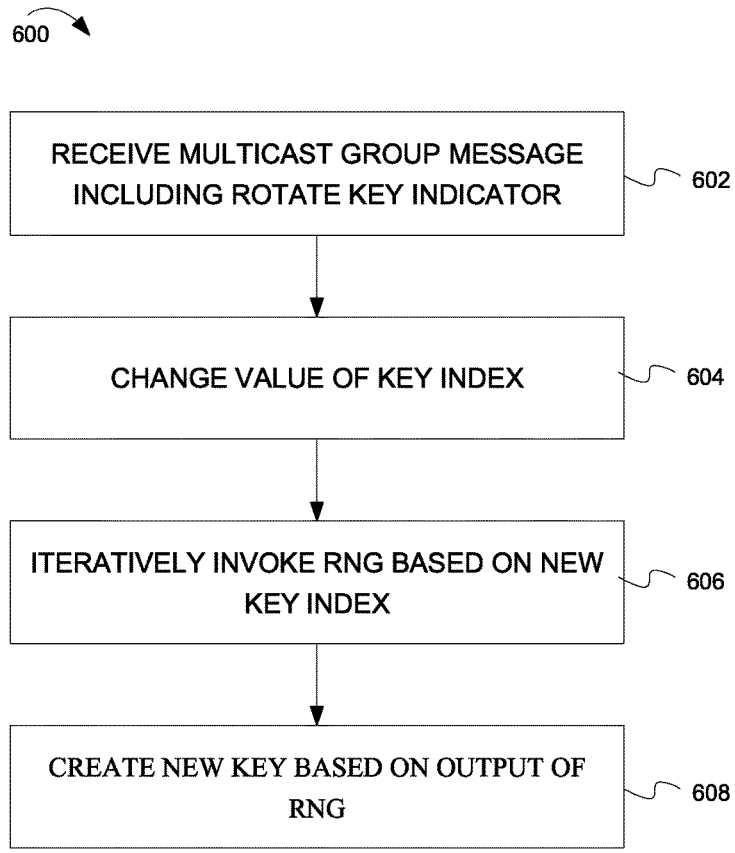
FIG. 6 depicts a flowchart of an example method for rotating keys used in a multicast group.

FIG. 6 is a flowchart 600 providing details of a method for rotating a key for a multicast group. The method begins at block 602 by receiving a multicast group message that includes a rotate key indicator. The rotate key indicator may be expressed in various ways. In some embodiments, the rotate key indicator is a Boolean flag that when set, indicates that the key is to be rotated. In alternative embodiments, the rotate key indicator may be a "time to live" value that indicates the number of messages that are to be encrypted before rotating the key. Other indicators are possible and within the scope of the inventive subject matter.

At block 604, the value of the key index is changed in response to the rotate key indicator. For example, the key index may be incremented, or it may be set to a value in accordance with data received in a multicast message.

At block 606, the key RNG is invoked based on the new key index. In some embodiments, the key RNG is seeded as described at block 504 (FIG. 5). The key RNG is then invoked the number of times indicated by the new key index. In alternative embodiments, if the state of the key RNG is known, then the key RNG need not be reseeded and can be invoked based on the difference in the current index and the new key index. For example, if the client knows that the key RNG previously generated $key_n$, and the new index indicates $key_{n+1}$ is required, then the client does not need to reseed the key RNG and can invoke the key RNG once to obtain the values to generate $key_{n+1}$.

At block 608, the output of the key RNG determined at block 606 is used to determine the new key. In some embodiments, the final output of the key RNG from block 606 is used in a bitwise concatenation of the private passphrase with the key RNG output and again the private passphrase. The results of the concatenation are provided to the key hashing function to generate the new key.

Figure 7:
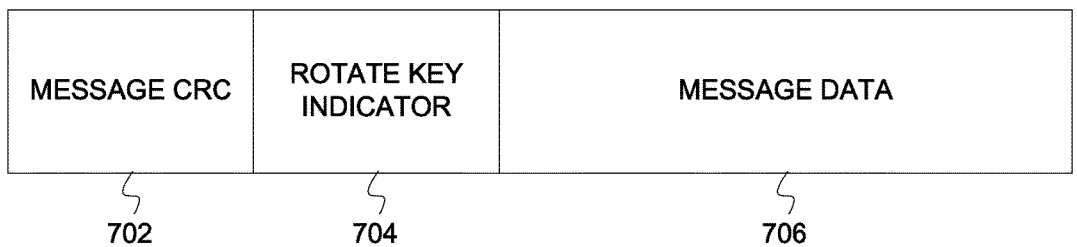
FIG. 7 is a block diagram illustrating an example message format for messages transmitted in a multicast group.

The keys generated using the systems and methods described above are used to encrypt and decrypt messages sent for the multicast group. FIG. 7 illustrates an example message 700 used in some embodiments. The message includes a message CRC 702, rotate key indicator 704 and message data 706. Message CRC is a cyclical redundancy check value for the message. Rotate key indicator 704 is a value that is used to indicate that a key is to be rotated. As noted above, the rotate key indicator maybe a Boolean flag, a time to live value or some other value that is used to determine when a key for the multicast group is to be rotated. In the case of a Boolean flag, the flag indicates whether the next message is encrypted with the current key or with the next key in the sequence of keys generated as described above.

As an example of the operation of the above systems and methods, assume a server such as a central game controller establishes a multicast group for use in a progressive game. At startup time, the server randomly generates an initialization vector for the encryptor using a source other than a key RNG. When the server is ready to broadcast a message, the server prepends the rotate key indicator 704 to the message data 706. The server then computes a CRC of the message data 706 and rotate key indicator 704 and prepends the CRC value to the message. Message 700 is then encrypted using the current key for the multicast group. The encrypted message is then transmitted using IP multicast.

Upon receiving a multicast message, the receiving network entity (e.g., a wagering game machine that is participating in the progressive game provided by the central game controller) decrypts the message using the currently known key for the multicast group. The network entity calculates a CRC of the rotate key indicator 704 and message data 706 in the received message and compares the calculated CRC with the message CRC 702. If the two values are the same, the message was decrypted successfully. If not, the message is discarded and the network entity must rejoin the multicast group in order to receive new messages. If the rotate key indicator 702 indicates that the key is to be rotated, then the network entity generates a new key as described above in FIG. 6.

Example Wagering Game Network

Figure 8:
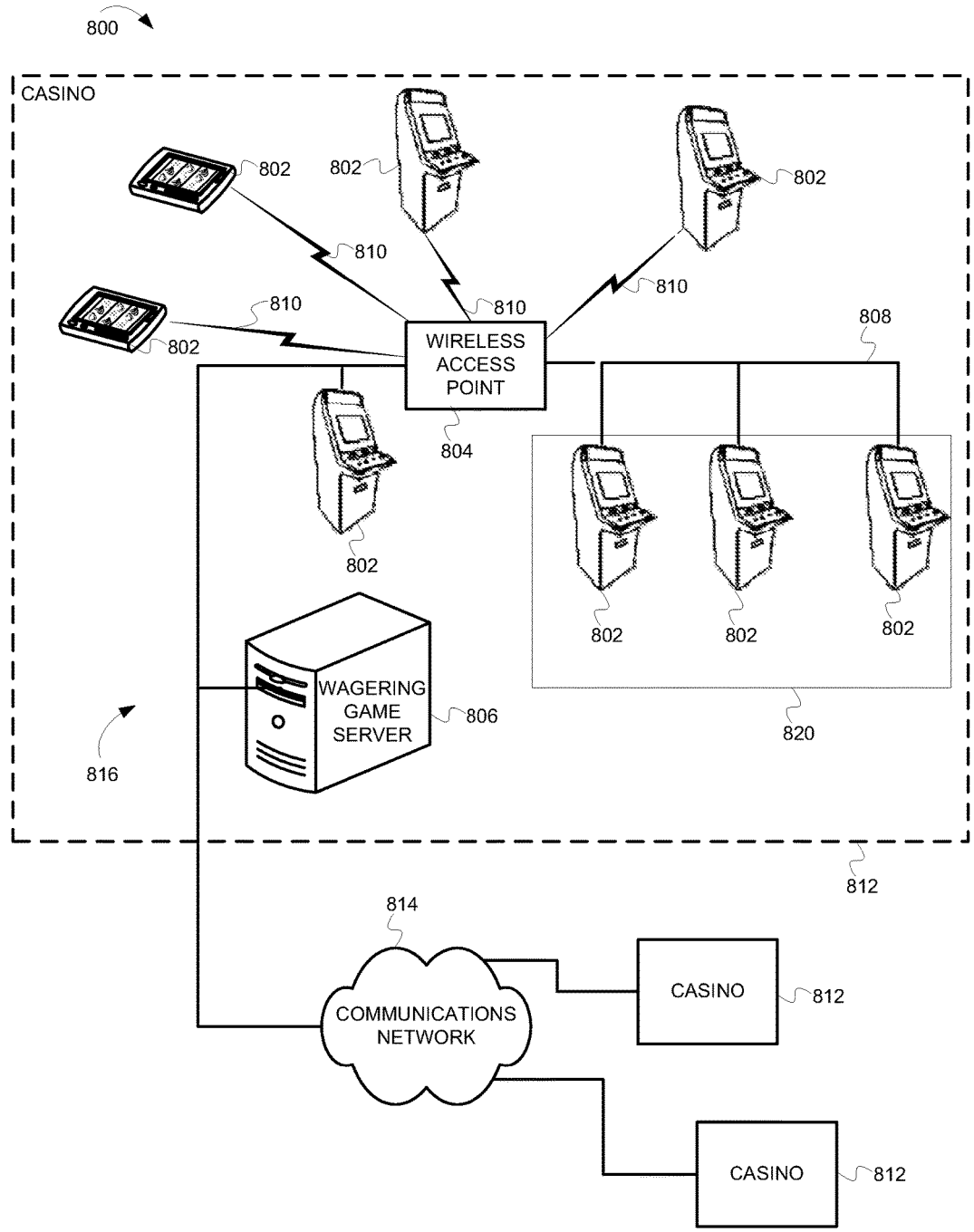
FIG. 8 is a block diagram of an example network of wagering game systems.

FIG. 8 shows how a plurality of wagering game machines can be connected in a wagering game network 800, according to example embodiments of the invention. As shown in FIG. 8, the example wagering game network 800 includes not only a plurality of wagering game machines and banks of wagering games that may exist within a casino, but may also include multiple casinos 812 connected to a communications network 814.

Each of the plurality of casinos 812 includes a local area network 816, which may include a wireless access point 804, wagering game machines 802, and in some example, a wagering game server 806 that can serve wagering games over the local area network 816. As such, the local area network 816 includes wireless communication links 810 and wired communication links 808. The wired and wireless communication links can employ any suitable connection technology, such as serial communications lines, Bluetooth, 802.11, Ethernet, public switched telephone networks, SONET, etc.

Wagering game machines can be organized as a bank of machines 820, where the bank of machines may be linked through network 816, or through a network or other communications system that is local to the bank of machines 820. In some embodiments, bank of machines 820 may be comprised of wagering game machines that are the same type or have the same general theme. The bank of machines 820 may share an overhead sign or kiosk. In one embodiment, the wagering game server 806 can serve wagering games and/or distribute content to devices located in other casinos 812 or at other locations on the communications network 814.

The wagering game machines 802 and wagering game server 806 can include hardware and machine-readable media including instructions for performing the operations described herein.

The wagering game machines 802 described herein can take any suitable form, such as floor standing models, handheld mobile units, bartop models, workstation-type console models, etc. Further, the wagering game machines 802 can be primarily dedicated for use in conducting wagering games, or can include non-dedicated devices, such as mobile phones, personal digital assistants, personal computers, etc. In one embodiment, the wagering game network 800 can include other network devices, such as accounting servers, wide area progressive servers, player tracking servers, and/or other devices suitable for use in connection with embodiments of the invention.

In various embodiments, wagering game machines 802 and wagering game servers 806 work together such that a wagering game machine 802 may be operated as a thin, thick, or intermediate client. For example, one or more elements of game play may be controlled by the wagering game machine 802 (client) or the wagering game server 806 (server). Game play elements may include executable game code, lookup tables, configuration files, game outcome, audio or visual representations of the game, game assets, or the like. In a thin-client example, the wagering game server 806 may perform functions such as determining game outcome or managing assets, while the wagering game machine 802 may be used merely to present the graphical representation of such outcome or asset modification to the user (e.g., player). In a thick-client example, game outcome may be determined and presented locally (e.g., at the wagering game machine 802) and then communicated to the wagering game server 806 for recording or managing a player's account.

Similarly, functionality not directly related to game play may be controlled by the wagering game machine 802 (client) or the wagering game server 806 (server) in embodiments. For example, power conservation controls that manage a display screen's light intensity may be managed centrally (e.g., by the wagering game server 806) or locally (e.g., by the wagering game machine 802). Other functionality not directly related to game play may include presentation of advertising, software or firmware updates, system quality, or security checks, etc.

Example Wagering Game Assembly

Figure 9:
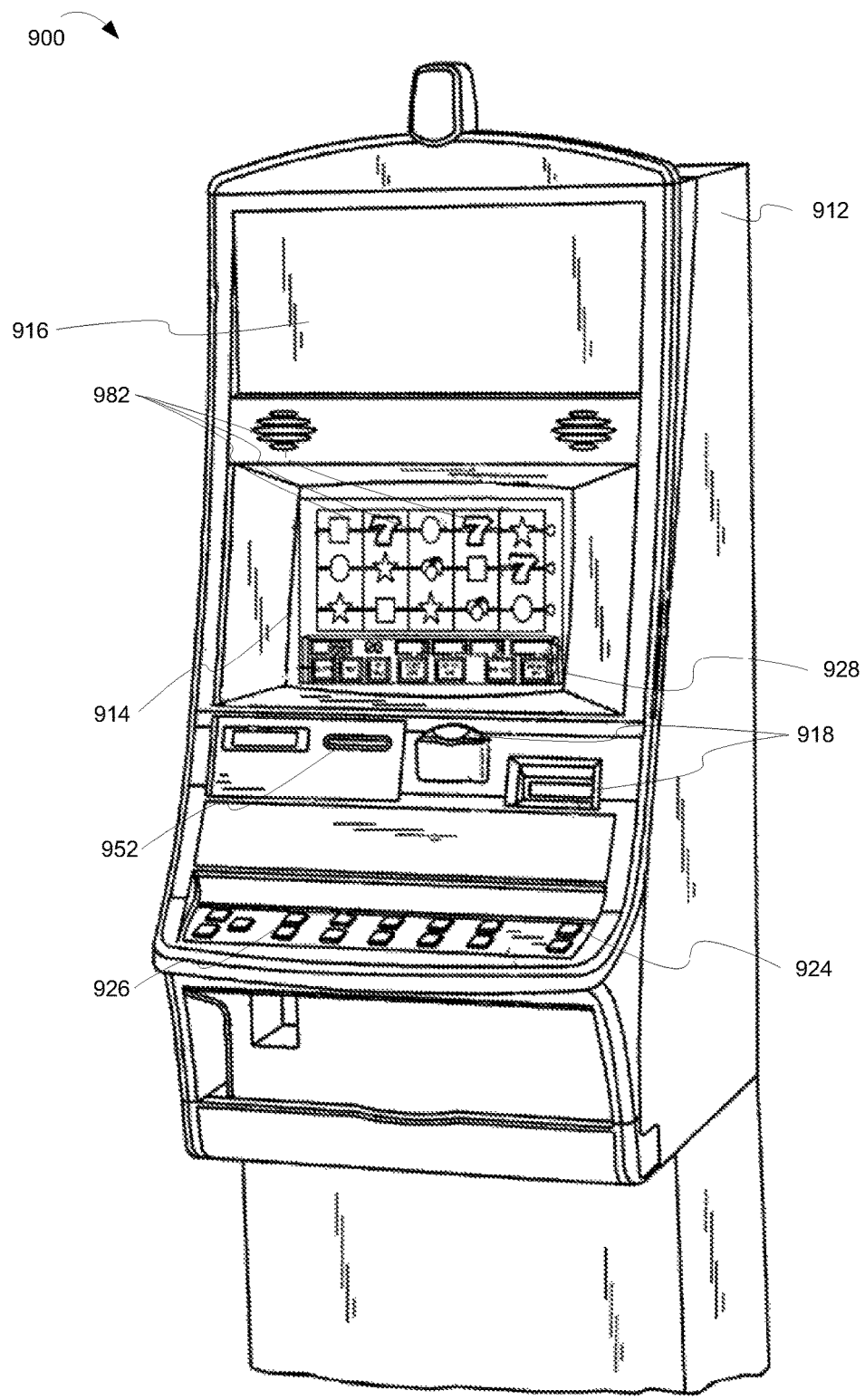
FIG. 9 is a perspective view of a wagering game assembly in accordance with one embodiment.

FIG. 9 depicts an example wagering game assembly 900, as one example assembly incorporating novel devices and methods as described herein. According to embodiments, the wagering game assembly 900 can be any type of wagering game machine and can have varying structures and methods of operation. For example, the wagering game assembly 900 can be an electromechanical wagering game machine configured to play mechanical slots, or it can be an electronic wagering game machine configured to present video casino games, such as blackjack, slots, keno, poker, blackjack, roulette, etc.

The wagering game assembly 900 comprises a housing 912 and includes input devices, including value input devices 918 and a player input device 924. For output, the wagering game assembly 900 includes a primary display 914 for displaying information about a basic wagering game. The primary display 914 can also display information about a bonus wagering game and a progressive wagering game. The wagering game assembly 900 also includes a secondary display 916 for displaying wagering game events, wagering game outcomes, and/or signage information. While some components of the wagering game assembly 900 are described herein, numerous other elements can exist and can be used in any number or combination to create varying forms of the wagering game assembly 900.

The value input devices 918 can take any suitable form and can be located on the front of the housing 912. The value input devices 918 can receive currency and/or credits inserted by a player. The value input devices 918 can include coin acceptors for receiving coin currency and bill acceptors for receiving paper currency. Furthermore, the value input devices 918 can include ticket readers or barcode scanners for reading information stored on vouchers, cards, or other tangible portable storage devices. The vouchers or cards can authorize access to central accounts, which can transfer money to the wagering game assembly 900.

The player input device 924 comprises a plurality of push buttons on a button panel 926 for operating the wagering game assembly 900. In addition, or alternatively, the player input device 924 can comprise a touch screen 928 mounted over the primary display 914 and/or secondary display 916.

The various components of the wagering game assembly 900 can be connected directly to, or contained within, the housing 912. Alternatively, some of the wagering game machine's components can be located outside of the housing 912, while being communicatively coupled with the wagering game assembly 900 using any suitable wired or wireless communication technology.

The operation of the basic wagering game can be displayed to the player on the primary display 914. The primary display 914 can also display a bonus game associated with the basic wagering game. The primary display 914 can include a cathode ray tube (CRT), a high resolution liquid crystal display (LCD), a plasma display, light emitting diodes (LEDs), or any other type of display suitable for use in the wagering game machine 400. Alternatively, the primary display 914 can include a number of mechanical reels to display the outcome. In FIG. 9, the wagering game assembly 900 is an "upright" version in which the primary display 914 is oriented vertically relative to the player. Alternatively, the wagering game machine can be a "slant-top" version in which the primary display 914 is slanted at about a thirty-degree angle toward the player of the wagering game assembly 900. In yet another embodiment, the wagering game assembly 900 can exhibit any suitable form factor, such as a free standing model, bartop model, mobile handheld model, or workstation console model.

A player begins playing a basic wagering game by making a wager via the value input device 918. The player can initiate play by using the player input device's buttons or touch screen 928. The basic game can include arranging a plurality of symbols along a payline 932, which indicates one or more outcomes of the basic game. Such outcomes can be randomly selected in response to player input. At least one of the outcomes, which can include any variation or combination of symbols, can trigger a bonus game.

In some embodiments, the wagering game assembly 900 can also include an information reader 922, which can include a card reader, ticket reader, bar code scanner, RFID transceiver, or computer readable storage medium interface. In some embodiments, the information reader 922 can be used to award complimentary services, restore game assets, track player habits and preferences, etc.

General

In this detailed description, reference is made to specific examples by way of drawings and illustrations. These examples are described in sufficient detail to enable those skilled in the art to practice the inventive subject matter, and serve to illustrate how the inventive subject matter can be applied to various purposes or embodiments. Other embodiments are included within the inventive subject matter, as logical, mechanical, electrical, and other changes can be made to the example embodiments described herein. Features or limitations of various embodiments described herein, however essential to the example embodiments in which they are incorporated, do not limit the inventive subject matter as a whole, and any reference to the invention, its elements, operation, and application are not limiting as a whole, but serve only to define these example embodiments. This detailed description does not, therefore, limit embodiments of the invention, which are defined only by the appended claims.

Each of the embodiments described herein are contemplated as falling within the inventive subject matter, which is set forth in the following claims.

What is claimed is:

1. A gaming system configured to multicast a message including encrypted game data over a communications network, the system comprising:
    a multicast server including a multicast channel; and
    a plurality of gaming machines in communication with the multicast server over the communications network and subscribing to the multicast channel, each gaming machine being primarily dedicated to playing at least one casino wagering game and including:
    one or more value input electronic device;
    one or more electronic processors configured to detect, via at least one of the one or more value input electronic devices, a physical item associated with a monetary value that establishes a credit balance, initiate the casino wagering game in response to an input indicative of a wager covered by the credit balance, and receive, via at least one of the one or more value input electronic devices, a cashout input that initiates a payout from the credit balance;
    a random number generator (RNG); and
    one or more memory devices storing instructions that, when executed by at least one of the one or more electronic processors, cause the gaming machine to:
    issue, via the network, a request to the multicast server to subscribe to the multicast channel;
    receive, via the network, a response from the multicast server that includes an address for the multicast channel and a key index for the multicast channel, the key index received by each gaming machine being the same;
    receive, via non-network communication, a global passphrase, the global passphrase received by each gaming machine being the same;
    create a seed based on the global passphrase;
    submit the seed to the RNG;
    generate random data by invoking the RNG according to the key index;
    generate a current encryption key for the multicast channel based on the random data from the RNG, the current encryption key generated by each gaming machine being the same;
    receive, via the network, the message being distributed to the multicast channel subscribers by the multicast server; and
    decrypt, via at least one of the one or more processors and according to the current encryption key, the encrypted game data included in the message.

2. The gaming system of claim 1, wherein at least one of the plurality of gaming machines receives the global passphrase from a portable memory device that is temporarily connected to the at least one gaming machine.

3. The gaming system of claim 2, wherein the at least one gaming machine further comprises a removable memory interface, and wherein the portable memory device is connected to the at least one gaming machine via the removable memory interface.

4. The gaming system of claim 1, wherein the encrypted game data includes data associated with one or more progressive jackpots.

5. The gaming system of claim 1, wherein the encrypted game data includes a wagering game program, and wherein the instructions further cause at least one of the plurality of gaming machines to load and present the wagering game program for play by a player at the at least one gaming machine.

6. The gaming system of claim 1, wherein the instructions further cause each gaming machine to receive, via the network, a rotate key indicator, to change the key index in accordance with the rotate key indicator, and to invoke the RNG according to the changed key index to generate a new encryption key for the multicast channel.

7. A computer-implemented method of multicasting a message, over a communications network, from a multicast server including a multicast channel to a plurality of gaming machines subscribing to the multicast channel, the message including encrypted game data, each of the plurality of gaming machines being primarily dedicated to playing at least one casino wagering game and including an electronic display device and one or more value input electronic devices, the method comprising:
    issuing, from each gaming machine of the plurality to the multicast server via the network, a request to subscribe to the multicast channel;
    receiving, at each of the gaming machines of the plurality from the multicast server via the network, a response including an address for the multicast channel and a key index for the multicast channel, the key index received by each gaming machine being the same;
    receiving, at each gaming machine of the plurality via non-network communication, a global passphrase, the global passphrase received by each gaming machine being the same;
    creating, by each gaming machine of the plurality, a seed using the global passphrase;
    submitting, by each gaming machine of the plurality, the seed to a respective RNG residing in each gaming machine;
    generating, by each gaming machine of the plurality, random data by invoking the respective RNG according to the key index;
    generating, by each gaming machine of the plurality, a current encryption key for the multicast channel based on the random data from the respective RNG, the current encryption key generated by each gaming machine being the same;
    receiving, at each gaming machine of the plurality via the network, the message distributed to subscribers of the multicast channel by the multicast server;
    decrypting, at each gaming machine of the plurality and according to the current encryption key, the encrypted game data;
    detecting, via at least one of the one or more value input electronic devices, a physical item associated with a monetary value that establishes a credit balance;
    initiating the casino wagering game in response to an input indicative of a wager covered by the credit balance; and
    receiving, via at least one of the one or more value input electronic devices, a cashout input that initiates a payout from the credit balance.

8. The method of claim 7, further comprising receiving, at each gaming machine of the plurality via the network, a rotate key indicator, and changing the key index in accordance with the rotate key indicator to generate a new encryption key for the multicast channel by invoking the RNG according to the changed key index.

9. The method of claim 7, further comprising receiving, at at least one of the plurality of gaming machines, the global passphrase from a portable memory device that is temporarily connected to the at least one gaming machine.

10. The method of claim 9, wherein the portable memory device is connected to the at least one gaming machine via a removable memory interface.

11. The method of claim 7, wherein generating the current encryption key includes applying a key hash function to the random data from the respective RNG.

12. The method of claim 11, further comprising receiving, at each gaming machine of the plurality of gaming machine, a key hash function identifier, and wherein generating the current encryption key includes selecting the key hash function from a plurality of key hash functions according to the key hash function identifier.

13. The method of claim 7, wherein creating the seed includes applying a seed hash function to the global passphrase.

14. The method of claim 7, further comprising applying an offset to the key index to determine a second key index for generating an alternate encryption key that encrypts messages from an alternate multicast channel.

15. The method of claim 14, wherein generating the alternate encryption key includes invoking an alternate RNG according to the alternate key index.

16. The method of claim 7, wherein the encrypted data includes data associated with a progressive jackpot, and wherein the method further comprises causing at least one gaming machine of the plurality to award the progressive jackpot during play of a wagering game, the awarded progressive jackpot being determined according to the encrypted data included in the message.

17. The method of claim 7, wherein the encrypted game data includes at least one wagering game program, and wherein the method further comprises causing at least one gaming machine of the plurality to load and present the at least one wagering game program for play by a player.

18. The gaming system of claim 1, wherein the seed is further based on the current key index.

* * * * *